United States Patent
Hands et al.

(10) Patent No.: US 8,954,860 B1
(45) Date of Patent: Feb. 10, 2015

(54) METHOD AND APPARATUS FOR GENERATING AND DISPLAYING TOURIST MAPS

(75) Inventors: Brent Alexander Hands, Seattle, WA (US); Marc Peter Tarca Wilson, London (GB)

(73) Assignee: Google Inc., Mountain View, CA (US)

( * ) Notice: Subject to any disclaimer, the term of this patent is extended or adjusted under 35 U.S.C. 154(b) by 134 days.

(21) Appl. No.: 13/595,853

(22) Filed: Aug. 27, 2012

(51) Int. Cl.
*G06F 17/30* (2006.01)

(52) U.S. Cl.
CPC .............................. *G06F 17/30873* (2013.01)
USPC ......................................................... 715/738

(58) Field of Classification Search
CPC ................... G06F 17/30873; G06F 17/30899; G06Q 30/20; H04L 29/0809; H04L 29/08072
USPC .......................................... 715/738; 701/450
See application file for complete search history.

(56) References Cited

U.S. PATENT DOCUMENTS

| | | | |
|---|---|---|---|
| 6,385,542 B1 | 5/2002 | Millington | |
| 6,498,982 B2 | 12/2002 | Bellesfield et al. | |
| 6,606,624 B1 | 8/2003 | Goldberg | |
| 7,359,714 B2 | 4/2008 | Parupudi et al. | |
| 7,428,522 B1 | 9/2008 | Raghunathan | |
| 7,529,854 B2 | 5/2009 | Parupudi et al. | |
| 7,769,745 B2 | 8/2010 | Naaman et al. | |
| 7,856,370 B2 | 12/2010 | Katta et al. | |
| 7,870,117 B1 | 1/2011 | Rennison | |
| 7,873,904 B2 | 1/2011 | Wang et al. | |
| 8,001,064 B1 | 8/2011 | Rennison | |
| 8,108,778 B2 | 1/2012 | Athsani et al. | |
| 2009/0055087 A1* | 2/2009 | Beacher | 701/200 |
| 2010/0083169 A1 | 4/2010 | Athsani et al. | |
| 2011/0046881 A1* | 2/2011 | Karaoguz | 701/208 |
| 2011/0047509 A1* | 2/2011 | Arrasvuori | 715/815 |
| 2011/0063301 A1 | 3/2011 | Setlur et al. | |
| 2011/0177845 A1 | 7/2011 | Fasold | |
| 2012/0029817 A1 | 2/2012 | Khorashadi et al. | |
| 2012/0030578 A1 | 2/2012 | Athsani et al. | |

OTHER PUBLICATIONS

"Boosting Value for the Hospitality and Travel Industry," Bing™ Maps (2009).
Christoph et al., "Context Detection on Mobile Devices," (2011).
Discovery Maps & Guides® (2012). Retrieved from the Internet on Aug. 29, 2012: URL:http://www.discoverymap.com/.

(Continued)

*Primary Examiner* — Amy Ng
*Assistant Examiner* — Roland Casillas
(74) *Attorney, Agent, or Firm* — Marshall, Gerstein & Borun LLP

(57) ABSTRACT

A computer-implemented method and system may modify categories for points of interest (POIs) for display on a map at a client computing device based on a bias value corresponding to a classification of a user. A system may receive interaction events from client computing devices. The interaction events may each include an indication of a user interaction with a POI displayed on a digital map at a client computing device and each POI may include a category and a default zoom level. Using a user's location data, the system and method may classify the user based on the user's familiarity with an area surrounding the interaction event POI and assign a numerical bias to POIs that include the category of each interaction event POI. Subsequent requests for mapping data may then return categories of POIs according to the type of user sending the request based on the bias value.

20 Claims, 7 Drawing Sheets

(56) References Cited

OTHER PUBLICATIONS

Grabler et al., "Automatic Generation of Tourist Maps," (2008).
Looije et al., "Usability Engineering for Mobile Maps," (2004).
McCleary, "Confronting the Tourist Map: Divergent Purposes and Disparate Users," (2009).
Mohomed et al., "Context-Aware Interactive Content Adaptation," MobiSys (2006).
Nivala et al., "An Approach to Intelligent Maps: Context Awareness," Workshop "HCI in Mobile Guides," (2003).
Schmidt-Belz et al., "Location-Based Mobile Tourist Services—First User Experiences," (2003).
Zipf, "User-Adaptive Maps for Location-Based Services (LBS) for Tourism," European Media Laboratory (2002).
Zipf, "User-Adaptive Maps for Location-Based Services for Tourism," (2003).

* cited by examiner

METHOD AND APPARATUS FOR GENERATING AND DISPLAYING TOURIST MAPS

FIELD OF TECHNOLOGY

The present disclosure relates generally to generating and displaying maps within a web-based mapping system and, more particularly, to generating and displaying maps based on determining that the system user is a tourist.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many mobile computing devices such as cellular phones, tablet computers, notebooks, etc., incorporate global positioning system (GPS) applications and related hardware. When actuated on the device, the GPS applications may communicate with a GPS transmitter or other GPS hardware on the device and a backend application server to provide a digital map of an area around the device's current position to a user, as well as label data and place page data. While planning a trip, a tourist may use a web-based or other mapping system to display a map of their proposed destination. Similarly, because these computing devices are mobile, users travel with the devices and use them to display maps of unfamiliar destinations.

Typical mapping systems generate and display identical maps for every user. For example, the mapping system may receive a request from both a local resident and a tourist for a map of a particular area. In response to the request, typical mapping systems return identical or nearly identical maps regardless of whether the requestor is a local resident of the requested map area or a tourist visiting or searching for the same requested map area.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In some embodiments, a computer-implemented method may modify a category of points of interest (POIs) for display on a digital map at a client computing device based on a bias value corresponding to a classification of a user. The method may receive a plurality of interaction events from a plurality of client computing devices via a computer network. The interaction events may each include an indication of a user interaction with a POI that is displayed on a digital map at a client computing device. Each POI may include a category and a default zoom level and the map may include a plurality of POIs.

The method may also compare location data corresponding to one or more of a client computing device or user profile data to an area of the digital map surrounding the interaction event POI to determine a user classification corresponding to the interaction event. The user classification may indicate a degree of familiarity with the area of the digital map surrounding the POI of the interaction event for each originator of an interaction event.

The method may then assign a numerical bias to map POIs that include the category of each interaction event POI. The bias may include a bias value and an indication of a user classification. Subsequent requests for one or more of the biased POIs may each include a request zoom level. Each request may also originate from a client computing device having a user classification that corresponds to at least one indication of user classification for the biased POIs. The method may then calculate a rank for the each biased POI within the request. The rank may be based on both the bias value for each biased POI of the request and the user classification of the client computing device associated with the subsequent request. Further, the method may modify the default zoom of one or more the biased POIs to the request zoom level based on the calculated rank, and send the requested mapping data to the client computing device in response to the subsequent request.

Other embodiments may include a computer-implemented method for receiving modified point of interest (POI) data at a client computing device in response to a request for mapping data to display POIs that are most relevant to a classification of the user sending the request. The method may send a plurality of interaction events. Each one of the interaction events may be sent from one of a plurality of client computing devices to a remote mapping system via a computer network. The interaction events may each include an indication of a user interaction with a point of interest (POI) displayed at a client computing device within a digital map and a user classification for each originator of an interaction event. The map displays a plurality of POIs and each displayed POI includes a category and a default zoom level. For each interaction event, the method may send location data corresponding to one or more of a client computing device or user profile data from the plurality of client computing devices to the remote mapping system via the computer network. The method may then subsequently send a request for mapping data from a client computing device to the remote mapping system via the computer network. The request for mapping data may include a request zoom level, a map area including one or more interaction event POIs, and a user classification for a user of the client computing device. The method may also receive the requested mapping data at the client computing device from the remote mapping system via the computer network in response to the request. The received mapping data may include one or more biased POIs. Each biased POI may include the request zoom level and a bias value corresponding to both the POI category and the user classification of the request. The method may then display the received biased POIs at the client computing device. Each displayed biased POI may include a bias value over a threshold value.

In still other embodiments, a computer system may modify a category of points of interest (POIs) for display on a digital map at a client computing device based on a bias for a type of user to interact with that category. The system may include two sub-systems: a point of interest bias system and a mapping system. The point of interest bias system may be in communication with a memory storing instructions for execution on a processor of the point of interest bias system. The instructions may include receiving a plurality of interaction events from a plurality of client computing devices via a computer network. The interaction events may each include an indication of a user interaction with a POI that is displayed on a digital map at a client computing device. Each POI may include a category and a default zoom level, the map including a plurality of POIs. The instructions of the point of interest bias system may also compare location data corresponding to a user to an area of the digital map surrounding the interaction event POI to determine a user classification corresponding to the interaction event. The user classification may indicate a degree of familiarity with the area of the digital map surrounding the POI of the interaction event for each originator of an interaction event. Further, the instructions of the point of interest bias system may assign a numerical bias to map POIs that include the category of each interaction event POI. The bias may include a bias value and an indication of a user classification.

The mapping system may be in communication with a memory storing instructions for execution on a processor of the mapping system. The instructions may be to subsequently receive a request for mapping data. The request may be for one or more of the biased POIs and include a request zoom level. The request may be sent from a client computing device having a user classification that corresponds to at least one indication of user classification for the biased POIs. The instructions of the mapping system may also calculate a rank for the each biased POI within the request, the rank based on the bias value for each biased POI of the request and the user classification of the client computing device associated with the subsequent request. Further, the instructions of the mapping system may modify the default zoom of one or more of the biased POIs to the request zoom level based on the calculated rank, and send the requested mapping data to the client computing device in response to the subsequent request.

Figure 1A:
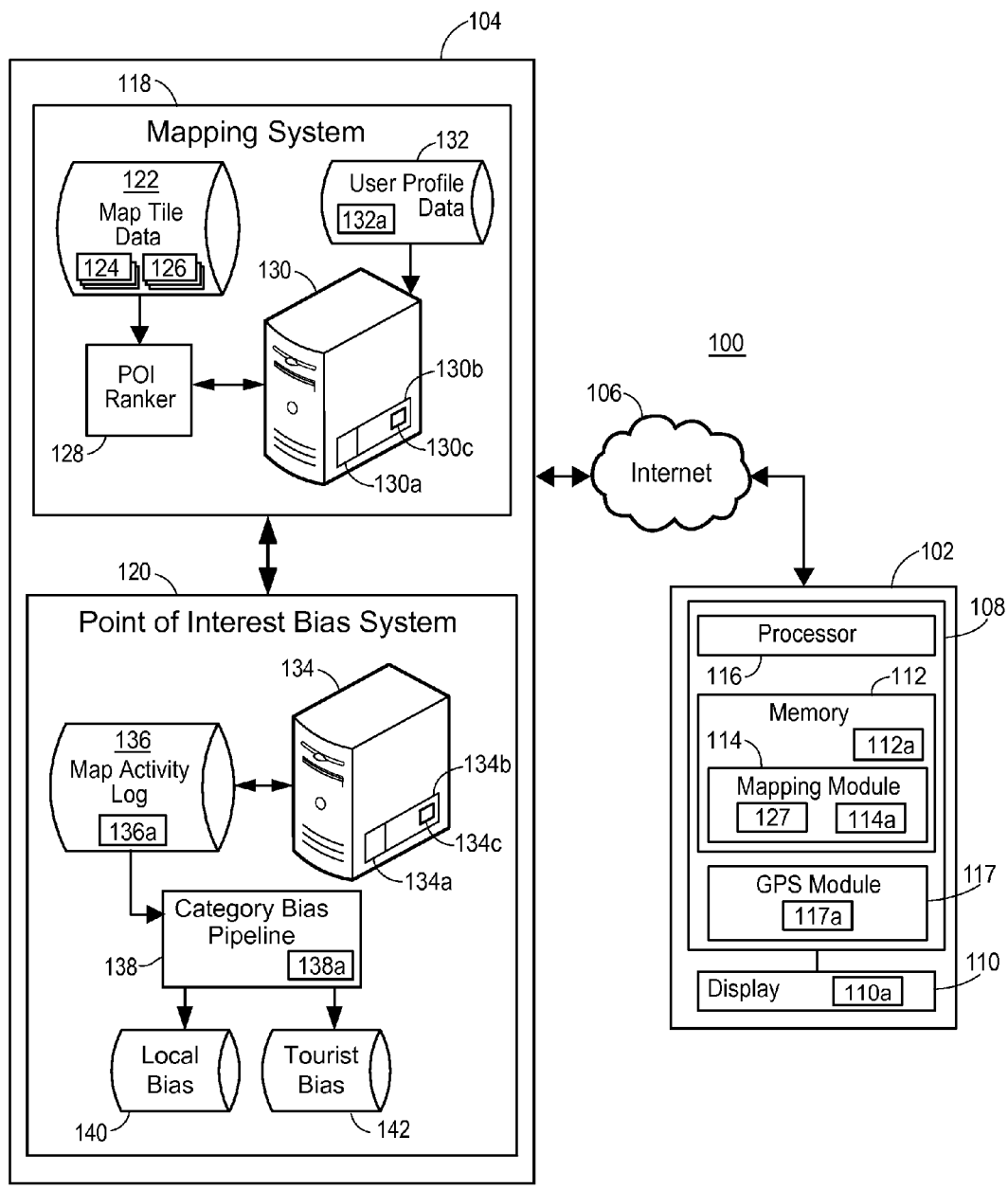
FIG. 1A illustrates one example of a high-level block diagram of a system for modifying a category of points of interest (POIs) for display on a digital map at a client computing device based on a bias value corresponding to a classification of a user.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Generally, a mapping system may generate vector data in response to a search or other request from a client computing device and send the vector data to the client. The vector data may include data for various points of interest (POI) that are represented on the map. To render a map image in a web browser, mapping application, or another application, the client device may request map data from the map server via a communication network. In response, the map server may provide vector data that describes map graphic content (roads, buildings, parks, terrain features, etc.) as well as POI (restaurants, stores, offices, hospitals, tourist attractions, etc.). More particularly, the vector data may specify various geometric shapes (e.g., using mathematical descriptions, formulas, etc.) for map features and indicate how these shapes should be positioned for rendering various map graphic content and POI on the client computing device. The map server also may specify which visual styles the client device should apply to various vector-based descriptions of map features.

A mapping system may prioritize POI data for display in a map based on various other data such as a user profile, an analysis of user activity and interaction with the POI data, and other data. For example, one type of system may generate the vector data to include POI data in a manner that changes based on whether the user of the mapping system is a tourist or a local resident of the geographical area being displayed in the map. In particular, the mapping system attaches a bias to categories of map POI based on whether a tourist or a local is more likely to interact with that category of POI. The bias may include a numerical value (e.g., from zero to one) that, when combined with another numerical value for the POI zoom level, may push the POI up or down to be displayed at different zoom levels based on how desirable that category of POI might be for a type (e.g., tourist or local) of user. Categories of map POI are pushed up or down for display at different map zoom levels to make the map more relevant to a tourist or a local as it is displayed at the client computing device.

Mapping system users may be classified as either tourists or locals. For example, each point of interest may include a category (e.g., Italian restaurants, hotels, grocery stores, theaters, etc.) and user interactions with POIs may be logged. The mapping system may determine a category bias for each point of interest based on a classification of each user interacting with that POI. Subsequently, when a user classified as a "tourist" or "local" or another class accesses a digital map including POIs within categories that have been biased more or less for that user's classification, the mapping system 100 may modify the zoom level for the POI within those biased categories. This modification may be reflected within the vector data sent to a client computing device in response to a request for mapping data 122 and may cause the client computing device to display the POIs within the biased category at a higher or lower zoom level. For example, if a high number of tourist users interact with POI having the category of Italian restaurant, then the mapping system 100 may modify vector data including POI in the Italian restaurant category in response to a request from a client computing device with a tourist user. When the tourist client computing device receives and processes the modified vector data, the tourist client computing device may display Italian restaurant POI at a higher zoom level than if the received data was in response to a request from a local user client computing device.

When users interact with a map POI, such as individual Italian restaurants, a mapping system server may anonymously log the user interaction with a home and current location of the user. If the home location of the user differs from the current location of the user, the interaction may provide the bias of a "tourist" to the category of Italian restaurants in some degree, depending on the distance from the user's home location. The degrees of "tourists" may differ from across town, to across the country, and around the world. The mapping system may collect these "category biases" over time and provide the biases of tourists versus locals towards those categories of POI. For example, the mapping system may provide client computing devices having a class of users with a higher category bias towards Italian restaurants with vector data indicating a higher zoom level for Italian restaurants. Alternately, if Italian restaurants have a lower category bias for the current user, the mapping system may generate vector data indicating a lower zoom level for those POIs. The mapping system may also provide modified vector data for any particular POI that has overwhelming interaction, regardless of the user class. The modified vector data may include data to cause the client computing device display bold text, extra data, highlighting, or other indications for the rendered POIs.

FIG. 1A is a high-level block diagram that illustrates a system 100 for generating and displaying tourist maps. Although FIG. 1 illustrates a client-server network environment, other aspects of the system 100 may include other configurations (peer-to-peer, single system, cloud, etc.). Generally, the system may include front end components 102 and back end components 104 that are communicatively linked via a network 106. The front end components 102 may include a client computing device 108 and display device 110. The client computing device 102 may include a memory 112 storing a mapping module 114. A processor 116 may execute instructions of the mapping module 114 to request, receive, process, and display tourist maps, as herein described. A GPS module 117 may include a GPS transceiver to provide the mapping module 114 with location data 117a corresponding to a current geographic location of the client computing device. The client computing device 102 may include a personal computer, smart phone, tablet computer, or other computing device. The computing device 102 is capable of executing the various modules, instructions, etc., described herein. The mapping module 114 may communicate with backend components 104 including a mapping system 118 and a point of interest (POI) bias system 120 via the network 106 such as the Internet 115 or other type of networks (e.g., LAN, a MAN, a WAN, a mobile, a wired or wireless network, a private network, or a virtual private network, etc.).

For simplicity, the client device 102 is illustrated with a single processor 116 to execute various modules stored in the device memory 112, as described herein. The client device 102 in other embodiments may include additional processing units (not shown) such as a graphics processing unit (GPU) configured to facilitate image rendering on the display 110, for example. Further, the mapping module 114 may utilize a library of graphics functions for efficiently generating a map image. For example, the memory 112 may store a plugin, such as an OpenGL® or Direct3D® library, having functions for rendering graphics which various applications executing on the client 102, including the mapping module 114, may access via an application programming interface (API). In another embodiment, the memory 112 stores a plugin particularly suitable for browser applications, such as WebGL®, for example. Also, in some embodiments, the memory 112 stores additional software components that facilitate efficient rendering of images via the display device 110. For example, the memory 112 may store an Adobe® Flash® plugin or an O3D plugin.

While the system 100 is illustrated in FIG. 1 as including the mapping system 118 and the point of interest bias 120 system 114 as backend components, the components and functions of the system 100 described herein may also be incorporated on the client computing device 102. For example, the POI bias system 120 may be implemented as computer-executable instructions of the mapping module 114, the mapping system 118 or as a separate module or system.

The mapping system 118 may include a mapping system server 130 in the form of one or more servers that may be communicatively linked to a map data repository 122 that stores map tile data 124 and point of interest (POI) data 126. The server 130 may include a processor 130a, memory 130b, and instructions 130c stored in the memory 130b. A POI Ranker module 128 may provide instructions and other functions for using the map tile data 122, POI data 126, data from the point of interest bias system 120, data from the client computing device 102, etc., to facilitate the creation and display of tourist maps with the server 130. In some embodiments, the mapping system 118 and the mapping system server 130 may send computer-executable instructions and data to allow the mapping module 114 at the client computing device 102 to render a digital map including modified POI data 127.

Figure 1D:
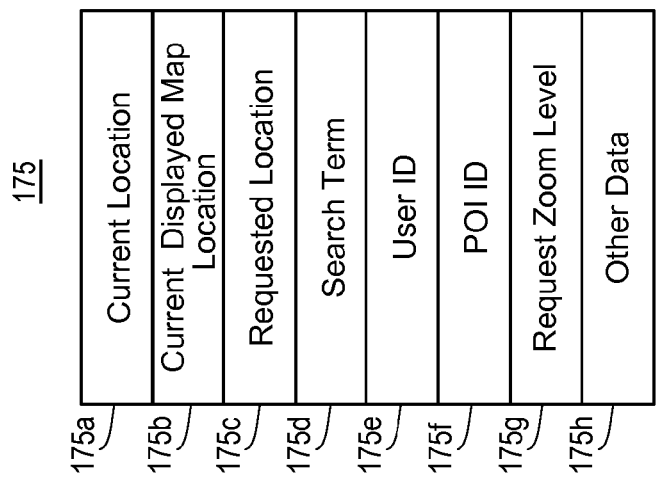
FIG. 1D illustrates an exemplary data structure for a map request.
Figure 1C:
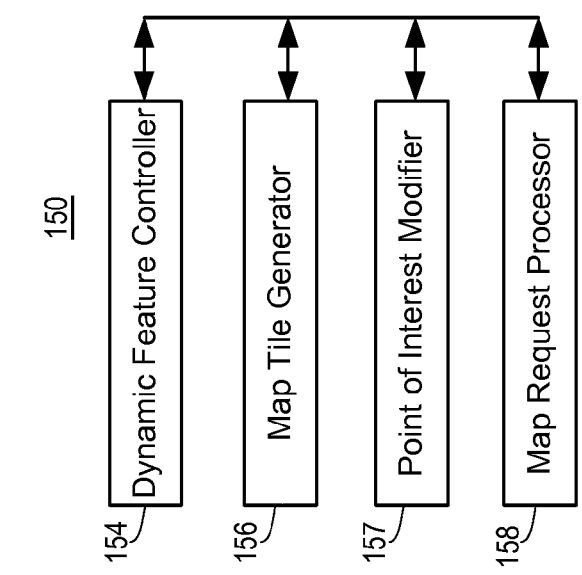
FIG. 1C illustrates an exemplary, high-level block diagram of a map controller.
Figure 1B:
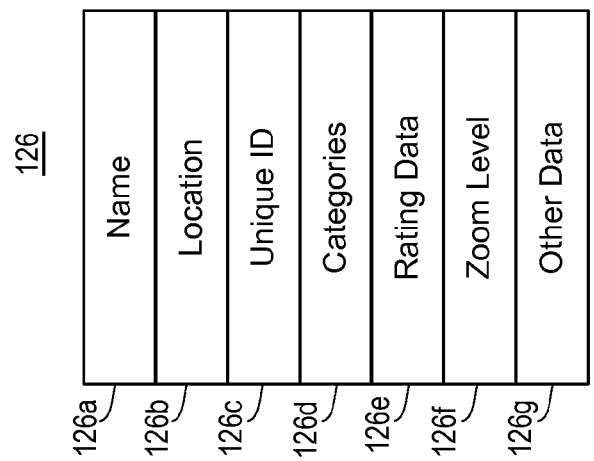
FIG. 1B illustrates an exemplary data structure for POI listing data.

With reference to FIG. 1B, POI listing data 126 may include any data structure that is able to store information about a specific POI (e.g., a business, a historical landmark, a park, an airport, an office, a school, etc.). A POI listing 126 may include data about a POI such as the name of the POI 126a, a location of the POI (e.g., longitude and latitude coordinates) 126b, a unique identifier 126c for the POI, one or more categories 126d, rating or review data 126e, a zoom level 126f at which the mapping module 114 of the client device displays the POI, or other information about the POI 126g.

The POI categories 126d may represent a characteristic of the POI or a type of POI. For example, a POI listing 126 may include category data 126d such as "business," "restaurant," "pizza restaurant," "restaurant chain," "shopping center," "retail store," "landmark," "park," "university," or some other category that may be used to group POIs. In some embodiments, the categories 126d may be organized into a hierarchical graph in which a category may have one or more parent categories and one or more child categories. For example, the "business" category may have "restaurant" and "retail store" categories as child categories and the "restaurant" category may have "Italian restaurant" and "restaurant chain" as child categories.

In some embodiments, the mapping system 118 may include one or more modules stored within memories of the various system components. The modules may include instructions that, when executed by a processor 130a, identify a user of a client computing device 102 that is currently using the mapping system 118 as tied to a particular geographic region in some degree. In some embodiments, the mapping system 118 may execute instructions 130c to compare a current location of the user (via a GPS module 117) to other data to indicate whether the user may be currently classified as a "tourist" or a "local." This classification may be used as an indication of the user's familiarity with the POI of the interaction event or of an area surrounding the POI for the originator of the interaction event, generally. In other embodiments, the system 118 may execute instructions to determine whether the user is a tourist or a local based on a comparison of mapping system data and the current map 110*a* generated by the mapping module 114 and displayed on the client computing device. For example, the system may execute instructions to compare the user's current location, currently viewed map 110*a*, or other data against user profile data 132 corresponding to each user of the client computing device 102. The user profile data 132 may include data indicating a degree of familiarity of the corresponding user for areas of the digital mapping data 122. In still other embodiments, the system 100 may classify a user as having various degrees of familiarity with search result. For example, the system may classify a particular search result as a home neighborhood, city, county, or a foreign neighborhood, city, or country.

The system 100 may notify a user that it uses information associated with the user's interaction with a digital map to identify the geographic location of interaction event POIs and/or the user's computing device. A user may consent to the use of the information associated with the user's interaction with the mapping system. For example, the user may indicate his or her consent via a webpage or within a map 110*a* within the display 110. The interaction events 136*a* and information associated with the events may be encrypted before any information is stored in the system 100. Further, a client computing device 102 may periodically seek a user's consent for the continuing use of his or her location information. A user may also initiate a revocation of a previously consented use of his or her location information.

The mapping system 118 may also collect and store user profile data 132 after a user has consented to such data collection and storage. The system 118 may also initiate periodic requests for the user to re-consent to any personal data collection or may occasionally display an interface to allow the user to opt out of any data collection. The user profile data 132*a* may include a user's preferred geographic locations, a user's current address, or other data 132*a* indicating that a user corresponding to the user profile data is familiar with a particular geographic region and locations. The user profile data 132*a* may also include a social networking profile, a user profile for the mapping module, a profile of the client computing device, or any other link to data indicating the user's home address. The mapping module 114 may also store user profile data 112*a* locally at the client computing device 102. In some embodiments, the client computing device 102 in general and the mapping module 114 in particular may execute instructions to send user profile data 132*a* from the device 102 to the mapping system 118 via the network 106 and server 130 for storage in the user profile data repository 132.

The point of interest bias system 120 may include a bias system server 134. The server 134 may be in the form of one or more servers and may be communicatively linked to the client computing device 102 via the network 105 and a map activity log 136 that tracks which type of user (e.g., tourist, local, etc) interacts with the POI data 126. The server 134 may include a processor 134*a*, memory 134*b*, and instructions 134*c* stored in the memory 134*b*. In some embodiments, the POI bias system 118 and the bias server 134 may send computer-executable instructions and data to allow the mapping module 114 at the client computing device 102 to render a digital map including modified POI data 127 (i.e., POI data that is displayed at elevated or lowered zoom levels within a digital map displayed at the user's computing device) for tourist or local users.

The map activity log 136 may be configured to obtain user interactions received from the client device 102 with the user's consent and anonymously log interaction events 136*a*. These user interaction events 136*a* may be of various types (e.g., selections of POI listings on a mapping interface, selections of POI listings on a search result interface, search queries associated with the POI listing, etc.) received by the server 134 via the network 105. In one embodiment, in order to conserve computing resources, the log 136 may not log every user interaction received by the server 134. Instead, the log 136 may log a smaller sampling of user interactions for a period of time. The smaller sampling may be a random or near random selection of user interactions.

The log 136 or other component of the point of interest bias system 120 may also be configured or include instructions to determine which categories 126*d* of POI data 126 are associated with each logged user interaction. For example, a user interaction event 136*a* may be associated with a particular category 126*d* of a POI data 126 listing (e.g., the user interaction is a selection of a POI listing on a digital map displayed at a client computing device within a mapping interface). The log 136 may match the user interaction to one or more categories 126*d* associated with the user interaction by locating the POI data 126 listing stored in the mapping system data repository 122 and identifying one or more categories 126*d* that the POI data 126 listing is associated with. As such, the interaction events 136*a* may include a history of user interactions with the POI data 126 and other system components and data.

A category bias pipeline module 138 may include instructions to determine and assign a POI bias to various POI data 126 in response to a request for mapping data 122 from a mapping module 114 or an interaction event with the mapping data 122 where the system 100 previously determined whether the user is a tourist or a local. For example, if the mapping system 118 determines that a current request for mapping system data 122 in general and interaction with POI data 126 in particular originates from a local user, then the category bias pipeline 138 may assign a local bias 140 to particular POI data 126 that may be returned with mapping system data 122 in response to the request or in response to a user's interaction with the POI data 126. Depending on the user's classification, the system 120 may assign either a local bias 140, tourist bias 142, or any range of bias, as described herein, to the various POI data 126 in response to various data requests or interactions with the POI data 126 from the mapping module 114. The client device 102 may then display the modified POI data 127.

In another embodiment, category bias pipeline 138 may be configured to monitor a number of categories 126*d* and determine a number of user interactions 136*a* associated with each of the categories 126*d*. For example, the pipeline 138 may maintain a counter for each category 126*d* and increment the counter corresponding to the type of user (e.g., tourist, local, etc.) for a category 126*d* when the log 136 determines that a user interaction event 136*a* is associated with that category 126*d*. The pipeline 138 may also be configured to determine a category bias 138*a* score for each category 126*d* based on the number of interactions associated with the category (e.g., the category's counter value) for the type of user (e.g., tourist or local). The bias 138*a* may be used to represent how popular or how useful a category is to a tourist or local user.

In a still further embodiment, the bias pipeline module 138 may include instructions to assign a bias 140, 142 to data associated with the POI. For example, the module 138 may include instructions to assign a bias 140, 142 to POI data 126 based on the categories 126*d* of each POI data 126 listing (e.g., Italian restaurants, historical sites, emergency services, etc.) and the type of user. For example, the highest number of tourist users may interact with POI data 126 having an "Italian Restaurant" category 126d. In this scenario, responses to map tile requests having POI data 126 within the "Italian Restaurant" category 126d and a location 126b within the requested geographic area may be biased such that Italian Restaurant POI data 126 is visible at a higher zoom level 126f than POI data in other categories. For example, the bias module 136 may modify the zoom level 126f of all POI data listings having the category 126d of "Italian Restaurant" if the requesting user is a tourist.

Using the calculated bias 138a, the POI ranker module 128 may be configured to prioritize a POI data 126 listing for display on a map. In some embodiments, the POI ranker module 128 may include instructions to calculate a rank for each POI listing within a geographic region requested by the client device 102 based on the bias 138a for the category and the classification of the user as either a tourist or local. For example, the ranker module 128 may first determine whether a mapping data 122 request originates from client device 102 having a tourist classification or a local classification, and then rank POI data listings that satisfy the request. POI data 126 satisfying the request may include listings having an "Italian Restaurants" category 126d and listings having a "Fire Stations" category 126d. Italian Restaurants may have an assigned bias of 0.5, while Fire Stations may have an assigned bias of only 0.2. In this scenario, the ranker module 128 may rank POI data 126 having the "Italian Restaurants" category higher than listings having the "Fire Stations" category 126d. In response to the request, the client device 102 may receive the ranked or modified POI data 127. The client device 102 may then display POI data 126 having a higher rank, as determined by the ranker module 128, at a higher zoom level 126f than lower-ranked POI data 126.

If a particular POI data listing belongs to more than one category, the ranker module 128 may use the average bias of all the categories that the POI listing belongs to calculate the priority score of the POI listing. In another embodiment, the ranker module 128 may use a maximum category score of all the categories of which the POI listing is a member to calculate the priority score of the POI listing.

The POI zoom level 126f may indicate the default zoom level at which each POI 126 may be displayed within a map 110a at the client device 102 without applying any tourist or local bias, as described herein. For example, each request for mapping system data 122 received at the mapping system 118 may also indicate a zoom level 126f for which the map data 122 is being requested. The requested zoom level may determine an amount of map tile data 124 and POI data 126 that the mapping system 118 returns in response to a request from the mapping module 114. The size of a geographic region represented by an individual map tile depends on the requested zoom level with which the map tile is associated, so that a single map tile at a lower zoom level illustrates a larger geographic area than a single map tile at a higher zoom level. The mapping module 114 may display (or the mapping system 118 may send) each POI 126 having a location 126b included within the geographic region of a requested map tile only if the POI zoom level 126f matches the zoom level of the map tile request. As described herein, the system 100 may assign a bias to a category 126d of POI data 126 or to an individual POI data listing (e.g., the other data 126g). The POI ranker module 128 may then execute instructions to determine which POI data 126 categories 126d or individual listings are most important to the particular user (tourist user, local user, etc) and cause the client device 102 to display the most highly biased POI data 126 for that user at a zoom level that is elevated over the default zoom level 126f for the POI data 126. Thus, the tourist or local bias causes the system to display categories of POI data 126 or particular POI data listings at a higher or lower zoom level depending on the type of user that initiates the map data 122 request from the client device 102.

In another embodiment, the mapping system 118 may only send those POI data listing having a rank above a threshold in response to a data request from the client device 102. In a still further embodiment, the mapping system 118 may send all POI data listings within the requested geographic region in response to the request, but the mapping module 114 may only display those POI listings that include a rank above a threshold. Still further, the mapping module 114 may only receive or display a predetermined number of POI listings located within the mapped area that have the highest rank (e.g., the POI listings with a top ten or twenty rank).

In response to a request from a client computing device 102, the mapping system 118 and POI bias system 120 may process and send graphics, text, and other data for a map image 110a to be displayed on a client computing device 102. A client device 102 request may also cause the mapping system 112 to send ranked or modified POI data 127 that may be displayed with the graphic map tile data 124. In one embodiment, the modified POI data 127 may include POI data 126 having a modified zoom level 126f based on a ranking determined by the ranker module 128, as described above. In another embodiment, the modified POI data 127 includes a subset of all the POI data 126 within a requested geographic region for a zoom level of the request. For example, a requested geographic region may include fifty POI data 126 listings. However, the ranking module 128 may determine that only thirty of the total fifty POI data listings include a tourist bias. In response to a request for mapping data 122 for this requested geographic region from a tourist user, the mapping system 118 may only send the thirty POI data listings including the tourist bias.

The device 102 may also display the modified POI data 127 with or without also displaying the retrieved map tile data 124. In some embodiments, the device 102 may display the modified POI data 127 as text data, a list of POI images, etc. When the client computing device 102 requests data 122 from the mapping system 118, the system 118 may generate each map tile 124 with or without POI data 126 according to a vector graphics format. The client device 102 (e.g., a mobile phone, tablet computer, etc.) may locally rasterize the vector data corresponding to each map tile for display at the device 102.

In an embodiment, the system 100 retrieves the requested data from various servers. For example, the instructions 130c stored in the memory 130b of the server 130 may include a map controller 150 (FIG. 1C), for example, that may be executable on the processor 130a directly (e.g., as compiled code) or indirectly (e.g., as a script interpreted by another application executing on the processor 130a). With reference to FIG. 1C, the map controller 150 includes a dynamic feature controller 154 that generates vector data for various map elements that the system 100 may provide as map content to the client device 102 for a displayed map 110a. As used herein, a map feature (or simply feature) may correspond to an individual map element such as a building or an aggregation of several map elements such as several buildings, a park, and several pedestrian paths of a college campus. In general, a map feature may be described using vector data. POI data 126 may include data that describes business and/or administrative aspects of the map tile features including textual information, images, icons, and web content for the map features (i.e., businesses, landmarks, tourist sites, historical landmarks, etc.), etc. Typically, the system 100 displays the POI data 126 as an icon and/or text describing the feature within the map 110a.

In some embodiments, in response to a request for mapping data via a search request, a user interaction with POI data 126, or other action, the mapping module 114 at the client device 102 receives vector data that specifies both graphical characteristics of map features as well as POI data 126 and, in some embodiments, modified POI data 127 that describes map features. Vector data specifies the map features as geometric shapes using mathematical descriptions of points and paths connecting the points. For example, rather than specifying each pixel that makes up a raster image of a line segment, vector data may specify the two endpoints of the line segment and indicate that the two endpoints are connected by a straight line. The mapping module 114 then may apply POI data 126 (and modified POI data 127) as appropriate to the specified line segment, so that the line segment is displayed with a particular title, description, category icon, etc. As another example, the vector data may specify the contour of a building, and the corresponding POI data 126 or modified POI data 127 may specify the name, description, category icon (e.g., restaurant, landmark, hospital, etc.), etc., of the building. In other words, rather than receiving raster images from the map server 130, the mapping module 114 may receive instructions for drawing a map image 110a on an output device 110 of the client computing device 102 and execute the instructions to generate a raster map image. In some cases, however, vector data also may include raster images as certain component elements that cannot be easily represented in a vector format.

The map controller 150 may include various functions and operate as a module in the memory of the client computing device 102 or in the servers 130, 134 of FIG. 1A, for example, or the various functions may be split among the client computing device 102 and the servers 130, 134, as described above. According to an embodiment, the map data controller 150 is implemented as a set of instructions that are stored on a computer-readable medium and executable on one or more processors. For example, referring back to FIG. 1A, the map data controller 150 and its various functions may be distributed among the memories 112, 130b, and 134b and processors 116, 130a, and 134a.

In one embodiment, the map controller 150 includes a dynamic feature controller 154, a map tile generator 156, a point of interest (POI) modifier 157, and a map request processor 158. The map request processor 158 may be configured to process requests from client devices, such as the client device 102, for map data 122 corresponding to specified or user preferred geographic regions. With reference to FIG. 1D, each request 175 may correspond to a data structure including a single electronic message or a series of electronic messages, depending on the scenario and/or embodiment. The map request 175 may include various data that may be used by the system 100 to generate and display tourist maps. While the request 175 of FIG. 1D illustrates several types of data that may be used to generate and display tourist maps, the systems and methods described herein may use all or only some of the types of data. In some embodiments, the request 175 may include current location data 175a, currently displayed map location data 175b, requested location data 175c, search terms 175d, a user identification 175e, a POI ID 175f, a requested zoom level 175g, and other data 175h. The current location data 175a may include location data 117a retrieved or received from a GPS module 117 of the client computing device 102. The currently displayed map location data 175b may include coordinates corresponding to a geographic location that is represented in a map 110a currently displayed at the client computing device 110a. The requested location data 175c may include coordinates or other data indicating a geographic location for display within the map 110a. Search term data 175d may include text entered by the user in a mapping module interface that describes features of various geographic locations for display on the map 110a. For example, a request 175 may include a search term 175d "Italian Restaurants" that may return a map 110a indicating all POI listings 126 within the category 126 or other POI data element matching the search term "Italian Restaurants" within a threshold distance of the current location 175a of the client device 102 or of the currently displayed map location 175b. The user ID 175e may include an indication of the user that sends the request 175 from the client computing device. The user ID 175e may correspond to a listing within the user profile data 132 (FIG. 1A) described herein. The POI ID 175f may include a unique identifier for a POI data listing corresponding to a user interaction event 136a (FIG. 1A) described below. The request zoom level 175g may include an indication of the zoom level for the map 110a currently displayed at the client device or an indication of an appropriate zoom level corresponding to a search term 175d. For example, a search term for "Chicago" or other term describing a large area may result in an appropriately high request zoom level 175g such that all or substantially all of the map tile data 124 and POI data 126 matching that term (e.g., POI data having "Chicago" as a name 126a, location 126b, or category 126d) may be sent by the system 118 in response to the request. Of course, the request 175 may also include other data 175h to generate and display tourist maps using the system 100.

The map request processor 158 may receive a request 175 for map data corresponding to a two-mile-wide region centered at latitude 41° 52' 43" and longitude −87° 38' 11". The map request processor 158 may also receive data allowing the processor 158 to determine whether the user is a tourist or local, or determine another indication of the degree of familiarity that the requesting user may have with the requested geographic region by comparing the various request data (175a-175h), user profile data 132, and other data related to the system 100. Further, the requested zoom level 175g may determine an amount of map tile data 124 and POI data 126 that the mapping system 118 returns in response to a request from the mapping module 114. The map request processor 158 may receive a request 175 for map tile data 124 and a request for POI data 126 in a single electronic message, e.g., a single HTTP message, or separately in respective electronic messages.

After the map request processor 158 receives a request 175 for map data 122 from a client device 102, the map controller 150 may provide appropriate data to the client device 102 via one or more electronic messages. In some embodiments, the map request processor 158 may include instructions to determine what type of data is being requested and execute a function call to one or more of the map tile generator 156 and the point of interest (POI) modifier 157 to retrieve the requested data from the appropriate data repository 122. The map tile generator 156 may include instructions to generate map data as a set of map tile descriptors, such that each map tile descriptor describes a map tile, i.e., a portion of a map image of a certain size (e.g., 256 by 256 pixels). The size of a geographic region represented by an individual map tile depends on the zoom level with which the map tile is associated, so that a single map tile at a lower zoom level illustrates a larger geographic area than a single map tile at a higher zoom level. Data retrieved in response to a user having a tourist or local classification may be processed by the POI ranker 128 and indicate a different zoom level for particular POI data listings than data retrieved in response to an unclassified user. For example, where the POI ranker 128 determines that a particular POI 126 is more important to a current tourist user of the client device 102 (e.g., via data the mapping system 118 receives or retrieves from the POI bias system 122, etc.) than other POI that may be displayed within a map tile, then the mapping system 118 may modify a zoom level of that particular POI 126 to generate modified POI data 127 that the mapping module 114 displays on the map 110*a*.

In sum, the map tile generator 156 may generate each response to a request 175 for map data 122 according to a vector graphics format, and a client device 102 may locally generate a raster image for each tile. The map tile generator 156 may retrieve the requested data from a map database such as the map tile database 122. The POI modifier 157 may increase or decrease a POI zoom level 126*f* in conjunction with processing by the category bias pipeline 138 and the POI ranker module 128, as described above, in response to the request 175 for map data from a tourist or local user.

The dynamic feature controller 154 may be communicatively coupled to the map tile generator 156 and POI modifier 157. The controller 154 may determine which map elements are associated with the requested map data and generate vector-based or other descriptions of these map elements. For example, the dynamic feature controller 154 may determine that, in response to a request 175 for map data 122 corresponding to zoom level Zi for a certain geographic region, vector descriptors corresponding to interstate highways, large bodies of water, etc. must be generated, whereas in response to another request 175 for map data corresponding to zoom level Zj for the same geographic region, additional vector data corresponding to local roads and buildings must be generated. The dynamic feature controller 154 may also determine that modified POI data 127 including a location 126*b* within the geographic area of the map request includes a higher or lower zoom level 126*f* than other data 122 that satisfies the request. Further, in some cases, the dynamic feature controller 154 generates different sets of vector data for different map types. For example, a terrain map may include map elements that are not included in a basic map for the same geographic region and zoom level.

Figure 2:
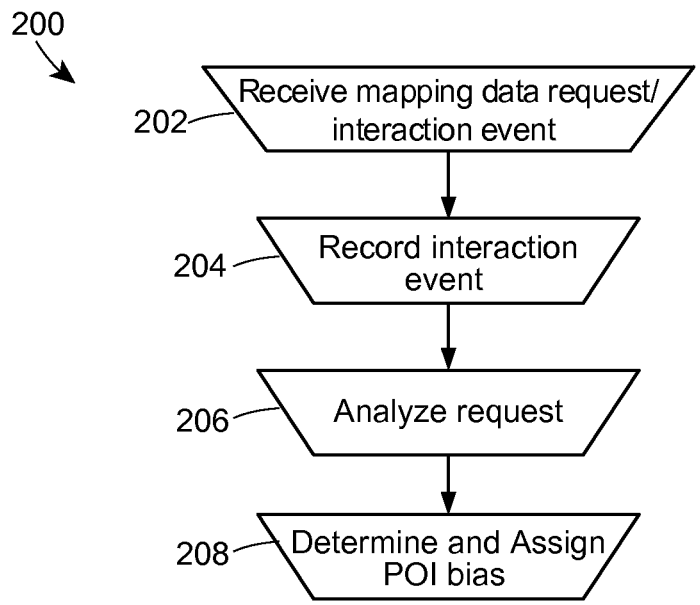
FIG. 2 illustrates an exemplary flow chart of one method for modifying a category of points of interest (POIs) for display on a digital map at a client computing device based on a bias value corresponding to a classification of a user.
Figure 3:
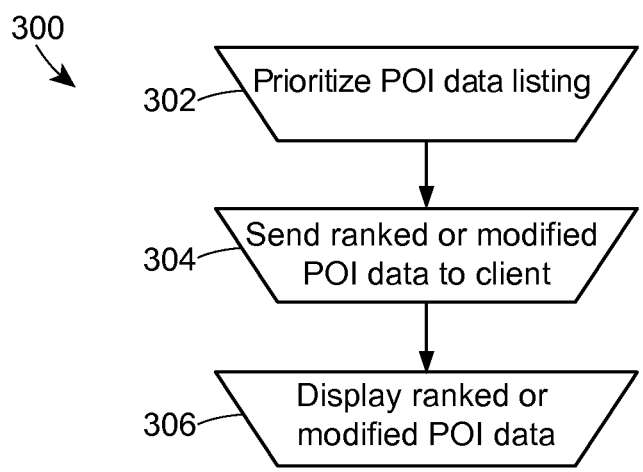
FIG. 3 illustrates an exemplary flow chart of another method for modifying a category of points of interest (POIs) for display on a digital map at a client computing device based on a bias value corresponding to a classification of a user.

FIGS. 2 and 3 are flow diagrams of example methods 200, 300 for generating and displaying tourist maps. The methods 200, 300 may include one or more blocks, modules, functions, pipelines, or routines in the form of computer-executable instructions that are stored in a tangible computer-readable medium and executed using a processor 116, 130*a*, 134*a* of the client device 102 (e.g., a smart phone, tablet computer, or a mobile computing device, or other personal computing device, as described herein) or one or more servers 130, 134. The methods 200, 300 may be included as part of any modules of a computing environment for a system 100 for generating and displaying tourist maps, for example, or as part of a module that is external to such a system. For example, the methods 200, 300 may be part of a backend map controller 150, instructions 130*c* of a mapping system server 130, instructions 134*c* of a point of interest bias system server 134, a frontend mapping module 114, or other system component. The methods 200, 300 may execute at either the frontend 102 or backend 104. Further, a user may activate or disable one or more options to allow or prohibit the system 100 to collect or send any user profile or other user-identifying data (e.g., preferred locations, current location, etc.) from any sources executing at or in communication with the client device 102. For example, a user interface of the mapping module 114 may allow a user to opt-in or opt-out of any user data use or collection as described herein. Furthermore, the method 200 may only use or access data that corresponds to a user in any way if the user affirmatively consents to such data use or access. FIGS. 2 and 3 will be described with reference to the Figures for ease of explanation, but the methods 200, 300 may of course be utilized with other objects and user interfaces.

With reference to FIG. 2, a method 200 may cause the system 100 to execute instructions to assign an indication of user familiarity to the POI data 126. At block 202, the system 100 may execute instructions to receive a request 175 for mapping data 122. For example, the backend components 104 may receive a request 175 for mapping system data 122 or a user interaction event 136*a* from the client computing device 102 via the network 106. The user interaction event 136*a* may include an indication of particular POI data 126 that a user selects, hovers over with a pointer device, searches for, or performs some other action with as displayed on a digital map 400 (FIG. 4A) at a client computing device. For example, a user may interact with the restaurant POI 401 within the map 400. In some embodiments, the user interaction event 136*a* includes a POI ID 175*f* as well as a user ID 175*e* or other data. At block 204, the system 100 may execute instructions to store the event 136 in a map activity log 136.

At block 206, the system may execute instructions to analyze the received interaction event 136*a*. In some embodiments, executing the instructions may classify the user as either a tourist or a local user, or determine a degree of familiarity a user of the client device 102 has with POI data 126 indicated by the interaction event data 136*a*. For example, the instructions may include determining whether the interaction event 136*a* or request 175 corresponds to a tourist or local user. The POI bias system server 134 may receive the user interaction event 136*a* in response to a user action with a POI displayed within a map 110*a* at the client device 102 or with a search request 175 indicating a particular POI listing or category 126*d* of POI data 126. In some embodiments, a user may select, hover, or perform some other action using a pointer device of the client computing device 102 with POI data 126 displayed in the map 110*a*. A user interaction event 136*a* may also include a selection of a POI data listing on a mapping interface or a selection of a POI listing on a search result interface at the client device 102. To determine the origin of the request, the system 134 may execute instructions to compare location data corresponding to the client computing device or a user, or user profile data 132*a* that corresponds to the user ID 175*e* to a current displayed map location 175*b*, the user's current location 175*a*, the requested location 175*c*, or other data 175*h* included in the request 175 or accessible by the system 100, generally. The profile data 132*a* may include indications of a user's likelihood to be familiar with the geographic area or POI of the search or request, current location, requested location, etc. For example, the profile data 132*a* may include an indication of the user's home address, favorite locations, neighborhoods, towns, regions, or countries, a birth city or other cities of past residence and periods of time the user visited or lived in those areas, and other information. By comparing the profile data 132*a* to other data indicating the current position of the device 102, a favorite location of the user, search request data, and other data, block 206 may determine a user's familiarity with the requested mapping data 122 and, thus, determine whether the received data corresponds to a tourist user or a local user. Block 206 may also execute instructions to determine varying degrees of each designation. For example, the event data 136*a* or request 175 may originate from a client device 102 within a user's home neighborhood, home city, home county, or foreign neighborhood, city, or country.

At block 208, the system 100 may execute instructions to determine and assign a POI bias to various POI data in response to receiving and analyzing the request/interaction. For example, if the request originated from a local user (as determined by block 206, above) then the category bias pipeline 138 may execute instructions to assign a local bias 140 to particular POI data 126 that may be stored with the mapping data 122 and used or returned with mapping system data 122 in response to the request or in response to a user's interaction with the POI data 126. Likewise, if the request originated from a tourist user (as determined by block 206, above) then the category bias pipeline 138 may execute instructions to assign a tourist bias 142 to particular POI data 126 that may be stored or returned with mapping system data 122 in response to the request or in response to a user's interaction with the POI data 126. Block 208 may further execute instructions to assign a range of biases to the POI data (e.g., a local bias 140, tourist bias 142, or any range of bias, as described above in relation to FIG. 1A-1D).

Block 208 may also execute instructions to monitor a number of categories 126d and determine a number of user interactions 136a associated with each of the categories 126d. For example, block 208 may cause the pipeline 138 to increment a counter at the pipeline module 138 for a category 126d when the log 136 determines that a user interaction event 136a is associated with that category 126d. In some embodiments, step 208 includes instructions to determine a category bias score for each category 126d based on the number of interactions associated with the category (e.g., the category's counter value) for the type of user (e.g., tourist or local). The bias 138a may, thus, be a measurement of how popular or how useful a category is to a tourist or local user. Block 208 may also include instructions to cause the pipeline module 138 to assign a bias 140, 142 to any data associated with the POI as described above in relation to FIG. 1a-c. For example, the module 138 may include instructions to assign a bias 140, 142 to POI data 126 based on the categories 126d of each POI data 126 listing (e.g., Italian restaurants, historical sites, emergency services, etc.) and depending on the type of user, as described above.

With reference to FIG. 3, a method 300 may cause the system 100 to execute instructions to prioritize and retrieve modified POI data 126 and display various POIs within a digital map at the client device 102 using higher or lower zoom levels depending on the user type and bias calculated by the method described at FIG. 2. At block 302, the method 300 may execute instructions to prioritize a listing of POI data 126 for display on a digital map. In one embodiment, the POI ranker module 128 may execute instructions to calculate a rank for each POI listing within a geographic region (e.g., the digital map 400) requested by the client device 102. The POI ranker module 128 may calculate the rank based on the bias 138a for the category and the classification of the user as either a tourist or local (block 206). For example, the ranker module 128 may first determine whether a mapping data 122 request originates from client device 102 having a tourist classification or a local classification, and then rank POI data listings that satisfy the request, as described above in relation to FIG. 1.

At block 304, in response to the request, the mapping system 118 may execute instructions to send the ranked or modified POI data 127 to the client device 102 via the network 106. As described above, the backend system 104 may send the ranked or modified POI data 127 as vector data to the client device 102 via the network. The vector data may include data for various POIs as well as ranked or modified POI data. The modified POI data 127 may include data that indicates an elevated or lowered zoom level to display a particular POI depending on the type of user.

Figure 4A:
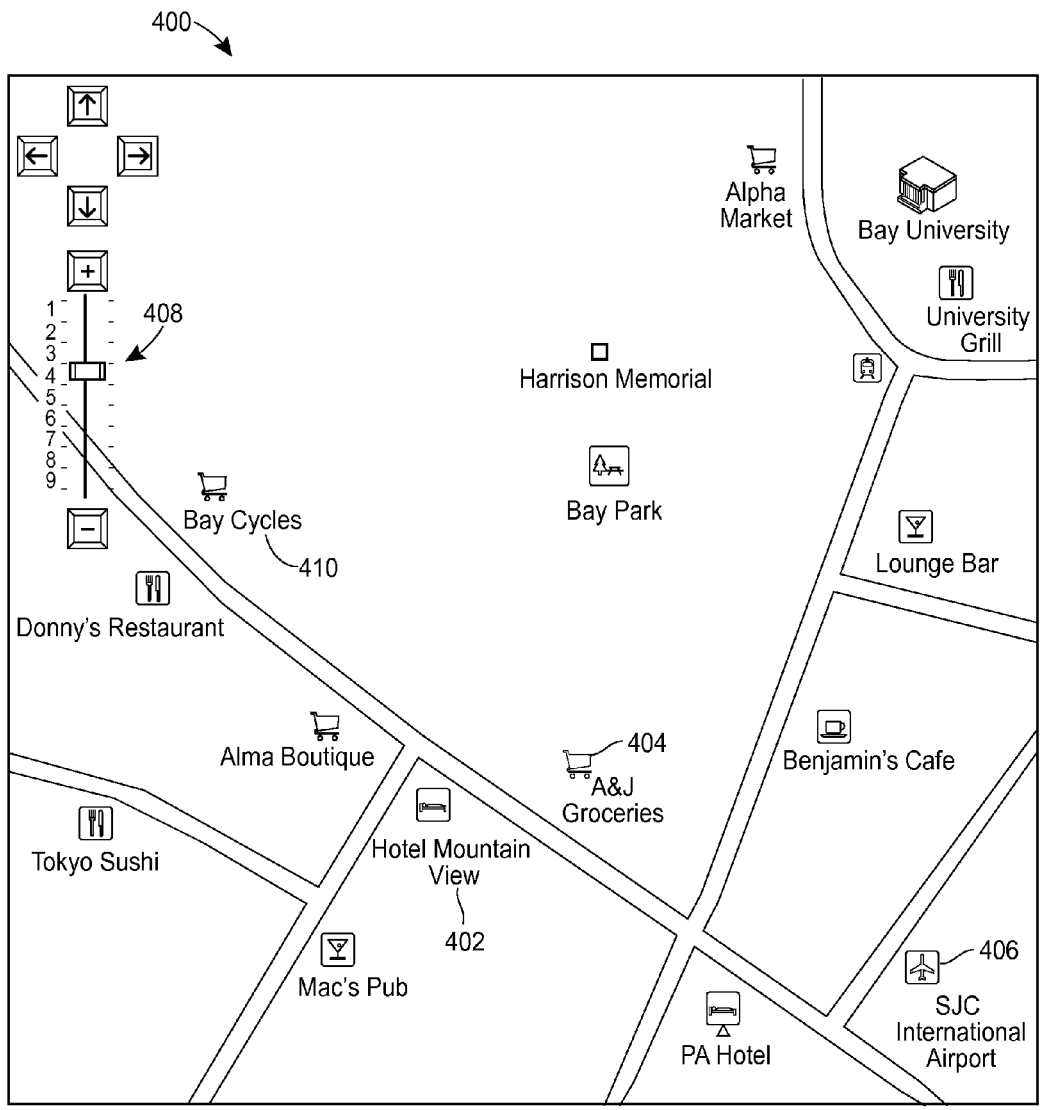
FIG. 4A illustrates a digital map.
Figure 4B:
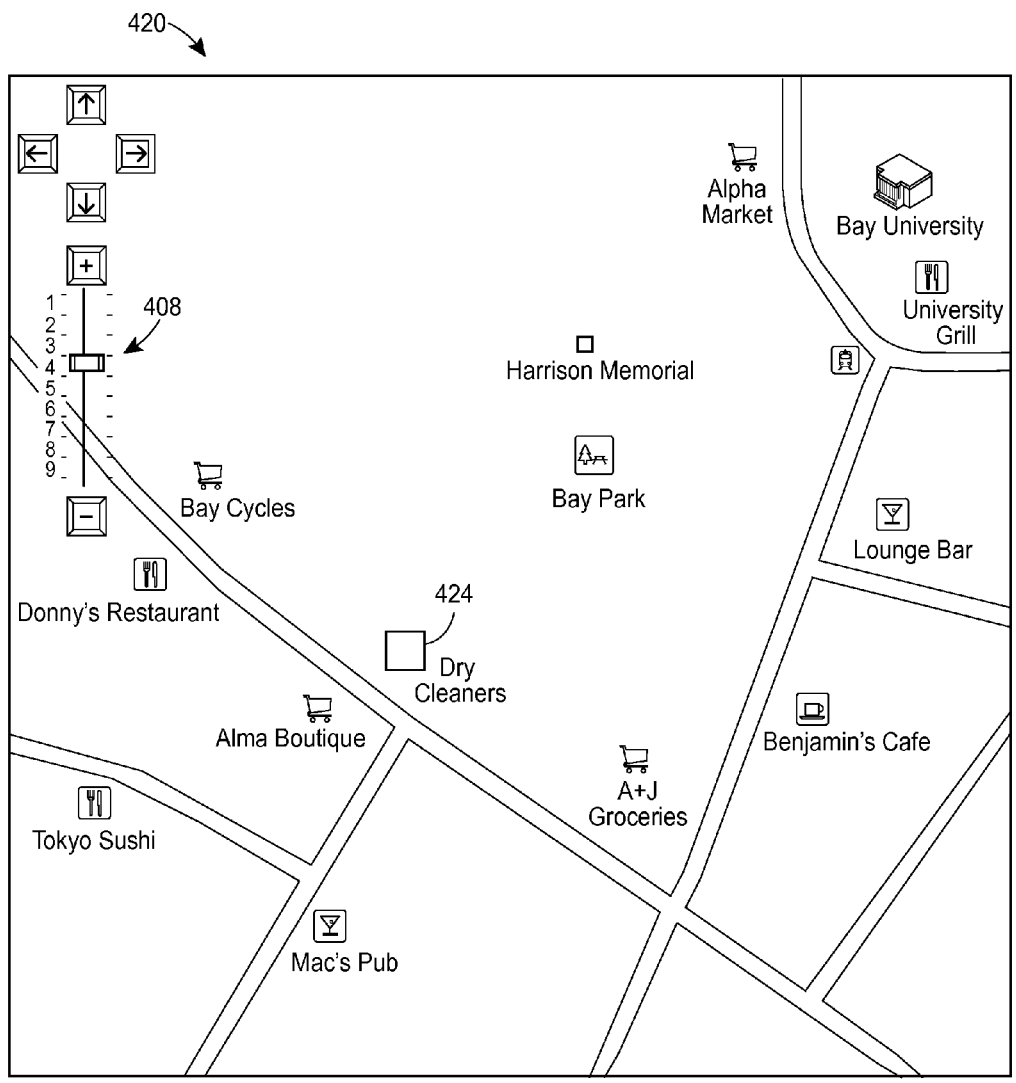
FIG. 4B illustrates a digital map showing POI data in response to a request for mapping system data from a user having a user classification indicating he or she is familiar with an area of the digital map.

At block 306, the client device 102 may then display POI data 126 and modified POI data 127, as determined by the ranker module 128, at a higher or lower zoom level than other POI data 126. Generally, the computing device 102 may process the received vector data to render a map image in a web browser, mapping application, or another application, including the ranked or modified POI data. With reference to FIG. 4A, a digital map 400 without biased POI data may display various POIs 402, 404, and 406 at a display zoom level 408 corresponding to the default zoom level 126f for each of those POIs. The default map 400 includes POIs with zoom levels 126f that have not been modified to account for a bias for particular categories of POIs based on the type of user. With reference to FIG. 4B, if block 206 determines that the user is local or familiar with the area of a displayed map, then a digital map 420 may display POIs that are particularly relevant to a local user at a higher display zoom level 422 from the default zoom level 126f. For example, a POI for a dry cleaners 424 may include a default zoom level 126f (FIG. 1B) to display the POI 424 at a display zoom level 422 lower than the level depicted in the digital map 420 (e.g., zoom level three rather than the current display zoom level four). However, the method 200 may determine that the dry cleaners POI 424 includes a category bias that ranks it higher than other POIs for a local user and the method 200 may modify the zoom level 126f for that particular POI 424. Block 306 may then display the POI 424 at the higher zoom level for a local user. Additionally, block 302 may decrease the default zoom level 126f for certain POIs that are not relevant for a local user. For example, an airport 406 or hotel POI 402 (FIG. 4A) may not be relevant or useful for a local user and, thus, such irrelevant POIs may include a low category bias, as determined by the method 200. Thus, block 302 may execute instructions to lower the default zoom level for POIs having a low bias for local users so that they do not appear on a map requested by a local user (FIG. 4B).

Figure 4C:
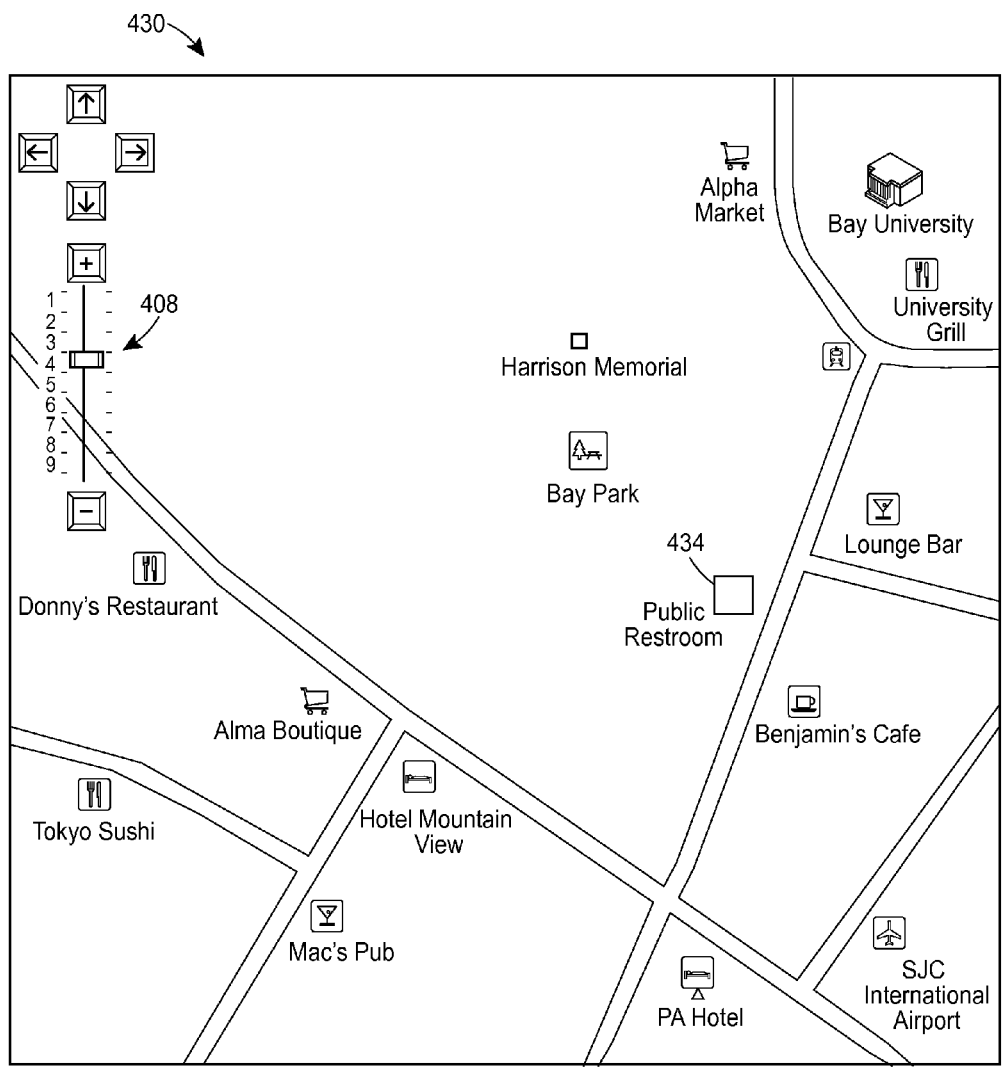
FIG. 4C illustrates a digital map showing POI data in response to a request for mapping system data from a user having a user classification indicating he or she is not familiar with an area of the digital map.

With reference to FIG. 4C, if block 206 determines that the user is a tourist or not familiar with the area of a requested map, then a digital map 430 may display POIs that are particularly relevant to a tourist user at higher display zoom level 432 from the default zoom level 126f. For example, a POI for a public restroom 434 may include a default zoom level 126f (FIG. 1B) to display the POI 434 at a display zoom level 432 lower than the level depicted in the digital map 430 (e.g., zoom level three rather than the current display zoom level four). However, the method 200 may determine that the public restroom POI 434 includes a category bias that ranks it higher than other POIs for a tourist user and the method 200 may modify the zoom level 126f for that particular POI 434. Block 306 may then display the POI 434 at the higher zoom level for a tourist user. Additionally, block 302 may decrease the default zoom level 126f for certain POIs that are not relevant for a local user. For example, a grocery store POI 404 (FIG. 4A) or a bicycle store POI 410 (FIG. 4A) may not be relevant or useful for a tourist user and, thus, such irrelevant POIs may include a low category bias for that type of user, as determined by the method 200. Thus, the method 300 may execute instructions to lower the default zoom level for POIs having a low bias for tourist users so that they do not appear on a map requested by a tourist user (FIG. 4C).

Figure 5:
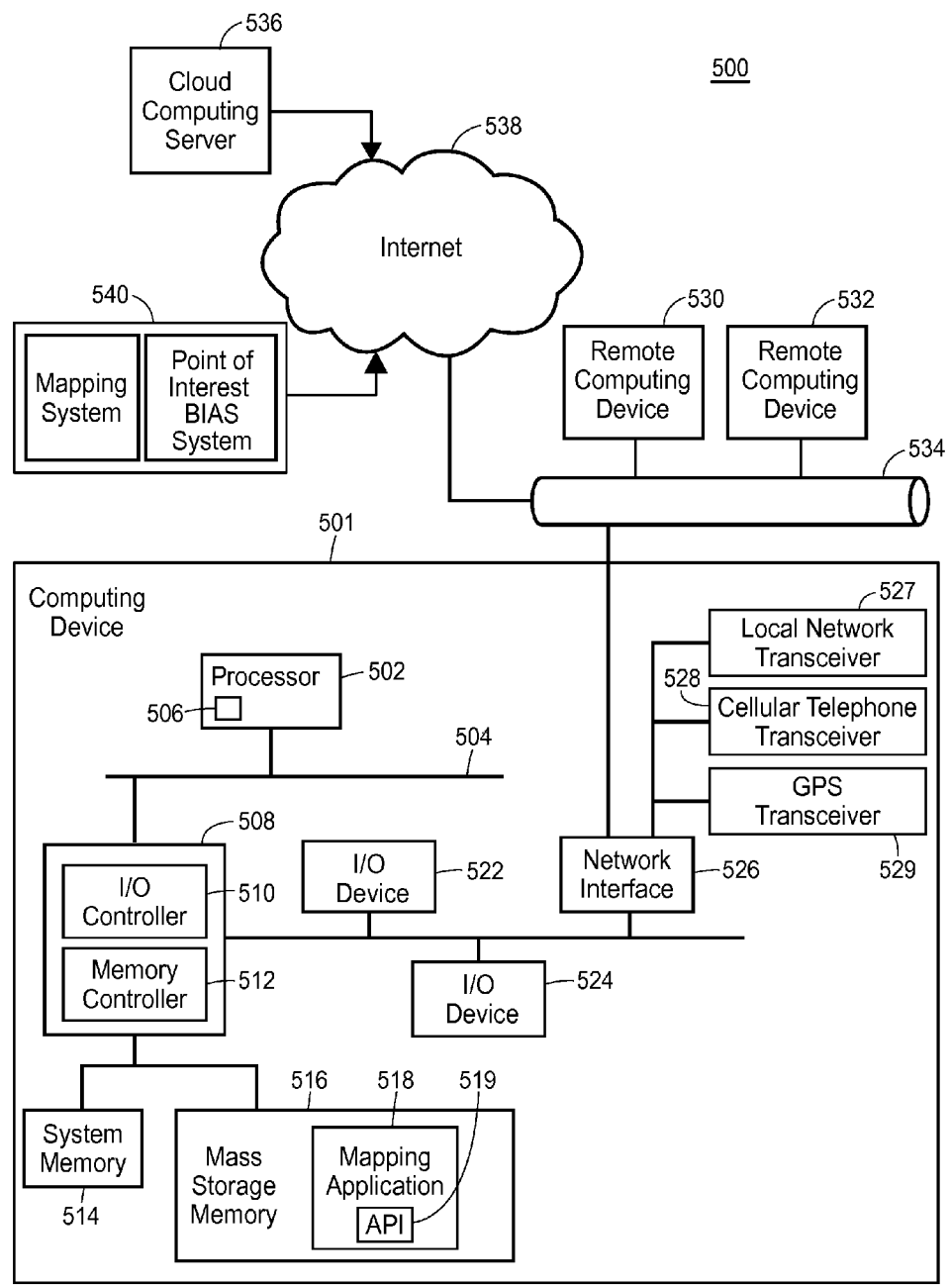
FIG. 5 is high-level block diagram of a computing environment that implements a system and method for pre-fetching data for cache storage and display on a computing device executing a mapping application.

FIG. 5 is a high-level block diagram of an example computing environment for a mobile mapping system 500 having a computing device 501 that may be used to implement the method and systems described herein. The computing device 501 may include a client computing device 102 (e.g., a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example mapping system 500 may be used to implement and execute the example system of FIG. 1A, the data structures of FIGS. 1B-1D, the methods of FIGS. 2 and 3, the example digital maps of FIGS. 4A-C, and the like. Although the example mapping system 500 is described below as including a plurality of peripherals, interfaces, chips, memories, etc., one or more of those elements may be omitted from other example processor systems used to implement and execute the example system 100 to generate and display tourist maps and other maps based on a user context relative to the location of the map. Also, other components may be added.

As shown in FIG. 5, the computing device 501 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the computing device 501 may be a multi-processor device and, thus, may include one or more additional processors that are identical or similar to the processor 502 and that are communicatively coupled to the interconnection bus 504.

The processor 502 of FIG. 5 is coupled to a chipset 508, which includes a memory controller 510 and a peripheral input/output (I/O) controller 512. As is well known, a chipset typically provides I/O and memory management functions as well as a plurality of general purpose and/or special purpose registers, timers, etc. that are accessible or used by one or more processors coupled to the chipset 508. The memory controller 510 performs functions that enable the processor 502 (or processors if there are multiple processors) to access a system memory 514 and a mass storage memory 516.

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the computing device 501 is used to implement a mapping application 518 having an API 519 (including instructions as described by the methods 200 and 300), the mass storage memory 516 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 501 and the mapping system 500. Thus, a module, block, function, operation, procedure, routine, step, and method can be implemented in hardware, firmware, and/or software. In one embodiment, program modules and routines (e.g., the mapping application 518, the API 519, etc.) are stored in mass storage memory 516, loaded into system memory 514, and executed by a processor 502 or can be provided from computer program products that are stored in tangible computer-readable storage mediums (e.g. RAM, hard disk, optical/magnetic media, etc.).

The peripheral I/O controller 510 performs functions that enable the processor 502 to communicate with peripheral input/output (I/O) devices 522 and 524, a network interface 526, a cellular network transceiver 527, a local network transceiver 528, and a GPS transceiver 529 (via the network interface 526) via a peripheral I/O bus 528. The I/O devices 522 and 524 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 522 and 524 may be used with the mapping application 518 to receive GPS data from the GPS transceiver 529, send the GPS data to the backend components of the system 100, render, and display maps and user interfaces as described in relation to the figures. A cellular telephone transceiver 527 may be resident with the local network transceiver 528. The local network transceiver 528 may include support for a Wi-Fi network, Bluetooth®, Infrared, or other wireless data transmission protocols. In other embodiments, one element may simultaneously support each of the various wireless protocols employed by the computing device 501. For example, a software-defined radio may be able to support multiple protocols via downloadable instructions. In operation, the computing device 501 may be able to periodically poll for visible wireless network transmitters (both cellular and local network) on a periodic basis. Such polling may be possible even while normal wireless traffic is being supported on the computing device 501. The network interface 528 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 512 and the I/O controller 510 are depicted in FIG. 5 as separate functional blocks within the chipset 508, the functions performed by these blocks may be integrated within a single integrated circuit or may be implemented using two or more separate integrated circuits. The mobile mapping system 500 may also implement the mapping application 518 on remote computing devices 530 and 532. The remote computing devices 530 and 532 may communicate with the computing device 501 over an Ethernet link 534. For example, the computing device 501 may receive mapping data created by a mapping application executing on a remote computing device 530, 532. In some embodiments, the mapping application 518 may be retrieved by the computing device 501 from a cloud computing server 536 via the Internet 538. When using the cloud computing server 536, the retrieved mapping application 518 may be programmatically linked with the computing device 501. The mapping application 518 may be a Java® applet executing within a Java® Virtual Machine (JVM) environment resident in the computing device 501 or the remote computing devices 530, 532. The mapping application 518 and/or the user preferences module 520 may also be "plug-ins" adapted to execute in a web-browser located on the computing devices 501, 530, and 532. In some embodiments, the mapping application 518 may communicate with back end components 540 such as the mapping system 118 and Point of Interest Bias System 120 via the Internet 538.

Using the systems and procedures described above, the system for generating and displaying tourist maps 100 and the mapping system 500 can display POI data in a more prominent manner depending on the user's classification as a tourist or local. The systems 100 and 500 may prioritize POI data for display in a map based on various other data such as a user profile, an analysis of user activity and interaction with the POI data, and other data. For example, the systems may generate vector data for processing by a client computing device to display POI data on a digital map in a manner that changes based on whether the user of the mapping system is a tourist or a local resident of the geographical area being displayed in the map. In particular, the systems may attach a bias to categories of map POI based on whether a tourist or a local is more likely to interact with that category of POI. Categories of map POI are pushed up or down for display at different map zoom levels to make the map more relevant to a tourist or a local as it is displayed at the client computing device. Of course, these systems may also present a user with a user interface from which the user is able to opt-out of any of the user context or tourist/local data gathering methods described herein.

The system 500 may include but is not limited to any combination of a LAN, a MAN, a WAN, a mobile, a wired or wireless network, a private network, or a virtual private network. Moreover, while only three remote computing devices 530 and 532 are illustrated in FIG. 5 to simplify and clarify the description, it is understood that any number of client computers are supported and can be in communication within the system 500.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for pre-fetching place page data for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process to generate tourist maps through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for modifying a category of points of interest (POIs) for display on a digital map at a client computing device based on a bias value corresponding to a user classification, the method comprising:
receiving an interaction event sent from a plurality of first client computing devices via a computer network, wherein the interaction event includes an interaction event POI from the plurality of POIs that are displayed on the digital map at the plurality of first client computing devices, each of the plurality of first client computing devices includes user profile data, and each POI includes a category and a default zoom level;
comparing the user profile data to an area of the digital map surrounding the interaction event POI, wherein the user profile data includes one or more of a preferred geographic location, a current address, and a social network profile;
determining the user classification of the first client computing device for the interaction event, wherein the user classification indicates a degree of familiarity with the area of the digital map surrounding the POI for an originator of the interaction event and the user classification is based on the comparison of the user profile data to the area of the digital map surrounding the interaction event POI;
assigning a numerical bias to each POI that includes the category of each interaction event POI, wherein the numerical bias includes a bias value and the determined user classification of the first client computing device for the interaction event;
subsequently receiving a request for mapping data from a second client computing device, the request including: 1) a request for one or more POIs that were assigned the numerical bias, 2) a request zoom level, and 3) a user classification of the second client computing device, wherein the user classification of the second computing device corresponds to at least one user classification for POIs that were assigned the numerical bias;
calculating a rank for the POIs that satisfy the request, the rank based on both the bias value for each POI that satisfies the request and the user classification of the second client computing device associated with the subsequently received request;
modifying the default zoom level of one or more POIs that satisfy the request to the request zoom level based on the calculated rank; and
sending the requested mapping data to the second client computing device in response to the subsequent request.

2. The method of claim 1, wherein the interaction event includes one or more of a user selection of a POI displayed at a client computing device, a user selection of one or more POI listings on a search result interface of the digital map, and a user search query associated with a displayed POI.

3. The method of claim 1, wherein the POI category includes a plurality of types to group POIs, each POI including one or more type, the plurality of types including business, restaurant, pizza restaurant, restaurant chain, shopping center, retail store, landmark, park, and university.

4. The method of claim 1, wherein determining the user classification includes comparing the user's current location or the area of the digital map surrounding the POI of the interaction event to user profile data, the user profile data including one or more of data indicating a degree of familiarity of the user for areas of the digital map, the user's preferred geographic locations, and the user's current address.

5. The method of claim 4, wherein the user classification includes tourist or local.

6. The method of claim 1, wherein assigning the numerical bias further includes determining a number of interaction events for each POI category per user classification for all interaction event POIs.

7. The method of claim 6, wherein the numerical bias is indicative of the number.

8. The method of claim 7, wherein the client computing device is configured to display POIs that were assigned a numerical bias corresponding to the user classification associated with the requested zoom level that is higher than the default zoom level for the POIs that were assigned a numerical bias.

9. The method of claim 1, wherein one or more of the POIs each include a plurality of categories and assigning the numerical bias further includes determining an average bias of all categories corresponding to each POI.

10. The method of claim 1, wherein one or more of the POIs include a plurality of categories and assigning the numerical bias further includes determining a maximum category score of all POI categories.

11. The method of claim 1, wherein sending the requested mapping data further includes sending POI data for POIs that were assigned a numerical bias including a POI bias value that exceeds a threshold value.

12. The method of claim 11, wherein modifying the default zoom level further comprises modifying the default zoom level for each POI of the request that includes the POI bias value over the threshold value.

13. A computer-implemented method for receiving modified point of interest (POI) data at a client computing device in response to a request for mapping data to display POIs that are most relevant to a classification of the user sending the request, the method comprising:

sending a plurality of interaction events, each one of the interaction events sent from one of a plurality of first client computing devices to a remote mapping system via a computer network, wherein each interaction event includes an interaction event POI corresponding to a POI that is displayed on a digital map at the plurality of first client computing devices, each of the plurality of first client computing devices includes user profile data, and each POI includes a category and a default zoom level;

for each interaction event, sending location data corresponding to the user profile data from each of the plurality of first client computing devices to the remote mapping system via the computer network, wherein the sent location data includes one or more of a preferred geographic location, a current address, and a social network profile;

subsequently sending a request for mapping data from a second client computing device to the remote mapping system via the computer network, the request including:
1) a request zoom level, 2) a map area including one or more interaction event POIs, and 3) a user classification of the second client computing device for the interaction event POIs;

receiving the requested mapping data at the second client computing device from the remote mapping system via the computer network in response to the request, wherein the received mapping data includes one or more POIs that were assigned a numerical bias, each numerical bias includes the request zoom level and a bias value corresponding to both the POI category and the user classification of the second client computing device sending the request; and displaying the received POIs that were assigned the numerical bias at the second client computing device, wherein each displayed POI that was assigned the numerical bias includes a bias value over a threshold value;

wherein the user classification of the second client computing device indicates a degree of familiarity with the map area including one or more interaction event POIs and is based on a comparison of user profile data corresponding to the second client computing device to the map area including the one or more interaction event POIs.

14. The method of claim 13, wherein each displayed POI that was assigned a numerical bias includes a user classification that matches the user classification for the user of the second client computing device.

15. The method of claim 13, wherein displaying the POIs that were assigned a numerical bias includes calculating a rank for each POI that was assigned a numerical bias based on each POI bias value.

16. The method of claim 13, wherein each of the plurality of interaction events includes one or more of a user selection of a POI displayed at a first client computing device, a user selection of one or more POI listings on a search result interface of the digital map, and a user search query associated with a displayed POI.

17. The method of claim 13, wherein the displayed POI category includes a plurality of types to group POIs, each POI including one or more type, the plurality of types including business, restaurant, pizza restaurant, restaurant chain, shopping center, retail store, landmark, park, and university.

18. The method of claim 13, further comprising determining the user classification for each interaction event.

19. The method of claim 18, wherein determining the user classification includes comparing the location data corresponding to the client computing device or an area of the digital map surrounding the POI of the interaction event to the user profile data, the user profile data including one or more of data indicating a degree of familiarity of the user for areas of the digital map, the user's preferred geographic locations, and the user's current address, wherein the user classification includes tourist or local.

20. A computer system for modifying a category of points of interest (POIs) for display on a digital map at a client computing device based on a bias for a type of user classification, the system comprising one or more processors and one or more memories to execute the instructions of:

a point of interest bias system in communication with a memory storing instructions for execution on a processor of the point of interest bias system, the instructions to:

receive an interaction event sent from a plurality of first client computing devices via a computer network, wherein the interaction event includes an interaction event POI from the plurality of POIs that are displayed on the digital map at the plurality of first client computing devices, each of the plurality of first client computing devices includes user profile data, and each POI includes a category and a default zoom level;

compare the user profile data to an area of the digital map surrounding the interaction event POI, wherein the user profile data includes one or more of a preferred geographic location, a current address, and a social network profile;

determine a user classification of the first client computing device corresponding to the interaction event, wherein the user classification indicates a degree of familiarity with the area of the digital map surrounding the POI for an originator of the interaction event and the user classification is based on the comparison of the user profile data to the area of the digital map surrounding the interaction event; and assign a numerical bias to each POI that includes the category of each interaction event POI, wherein the numerical bias includes a bias value and the determined a user classification of the first client computing device for the interaction event;

a mapping system in communication with a memory storing instructions for execution on a processor of the mapping system, the instructions to:

subsequently receive a request for mapping data from a second client computing device, the request including 1) a request for one or more POIs that were assigned the numerical bias, 2) a request zoom level, and 3) a user classification of the second client computing device, wherein the user classification of the second computing device corresponds to at least one user classification for POIs that were assigned the numerical bias;

calculate a rank for the POIs that satisfy the request, the rank based on the bias value for each POI that satisfies the request and the user classification of the second client computing device associated with the subsequently received request;

modify the default zoom level of one or more POIs that satisfy the request to the request zoom level based on the calculated rank; and send the requested mapping data to the second client computing device in response to the subsequent request.

* * * * *